Figure 2:
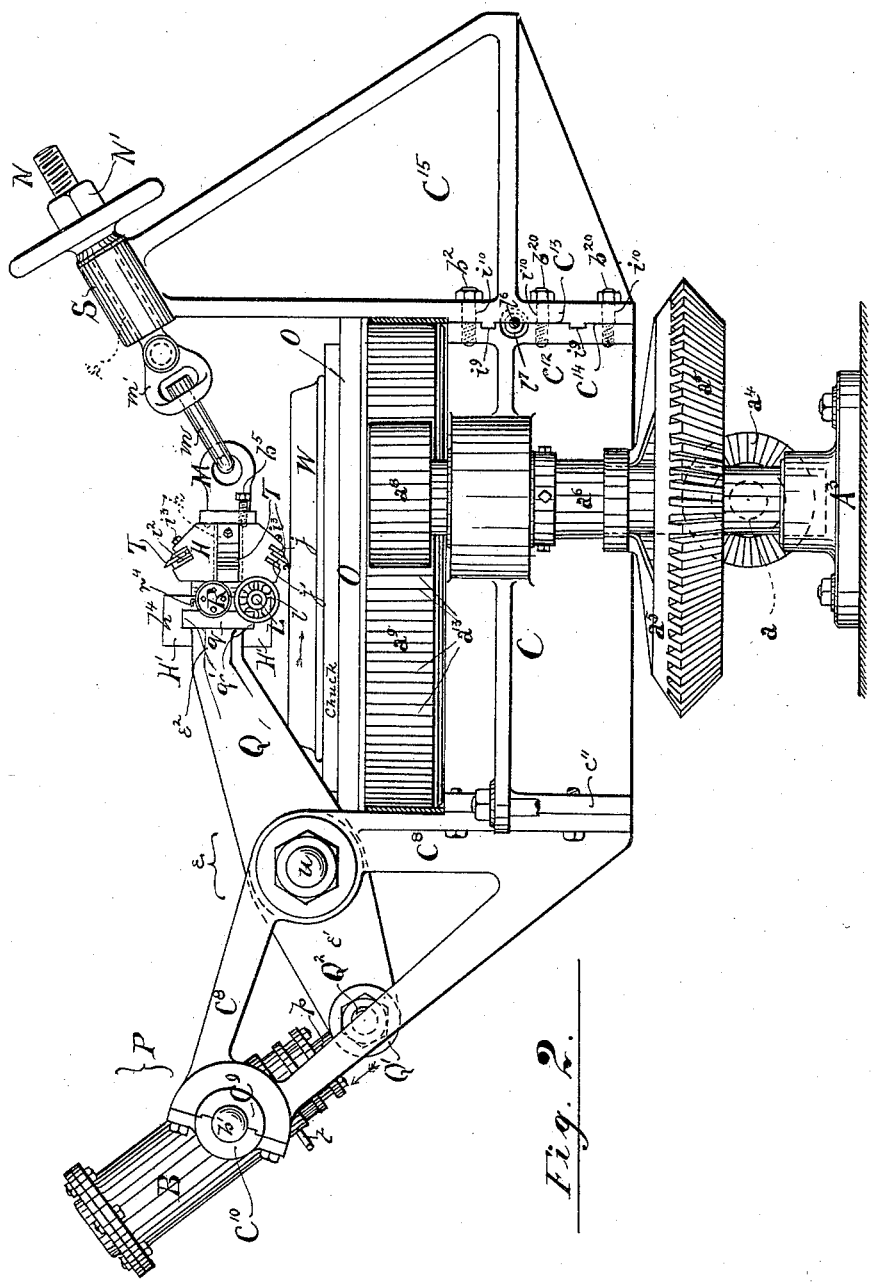

(No Model.) 6 Sheets—Sheet 1.

F. W. TAYLOR.
BORING AND TURNING MILL.

No. 448,277. Patented Mar. 17, 1891.

*Fig. 1.*

WITNESSES
Joshua Matlack, Jr.
Francis N. Easlack Jr.

INVENTOR
Frederick W. Taylor,
By his Attorney
H. W. Han Powel (No Model.) 6 Sheets—Sheet 2.

F. W. TAYLOR.
BORING AND TURNING MILL.

No. 448,277. Patented Mar. 17, 1891.

WITNESSES
Joshua Matlack, Jr.
Francis P. Eastlack, Jr.

INVENTOR
Frederick W. Taylor,
By his Attorney
H. W. Han Powel (No Model.) 6 Sheets—Sheet 3.

F. W. TAYLOR.
BORING AND TURNING MILL.

No. 448,277. Patented Mar. 17, 1891.

WITNESSES:
Joshua Matlack, Jr.
Francis P. Eastlack, Jr.

INVENTOR
Frederick W. Taylor,
BY H. W. Ham Powel

ATTORNEY (No Model.) 6 Sheets—Sheet 4.

F. W. TAYLOR.
BORING AND TURNING MILL.

No. 448,277. Patented Mar. 17, 1891.

WITNESSES:
Joshua Matlack, Jr.
Francis P. Eastlack, Jr.

INVENTOR.
Frederick W. Taylor,
BY H. W. Van Powel,
ATTORNEY.

(No Model.) 6 Sheets—Sheet 5.
F. W. TAYLOR.
BORING AND TURNING MILL.
No. 448,277. Patented Mar. 17, 1891.
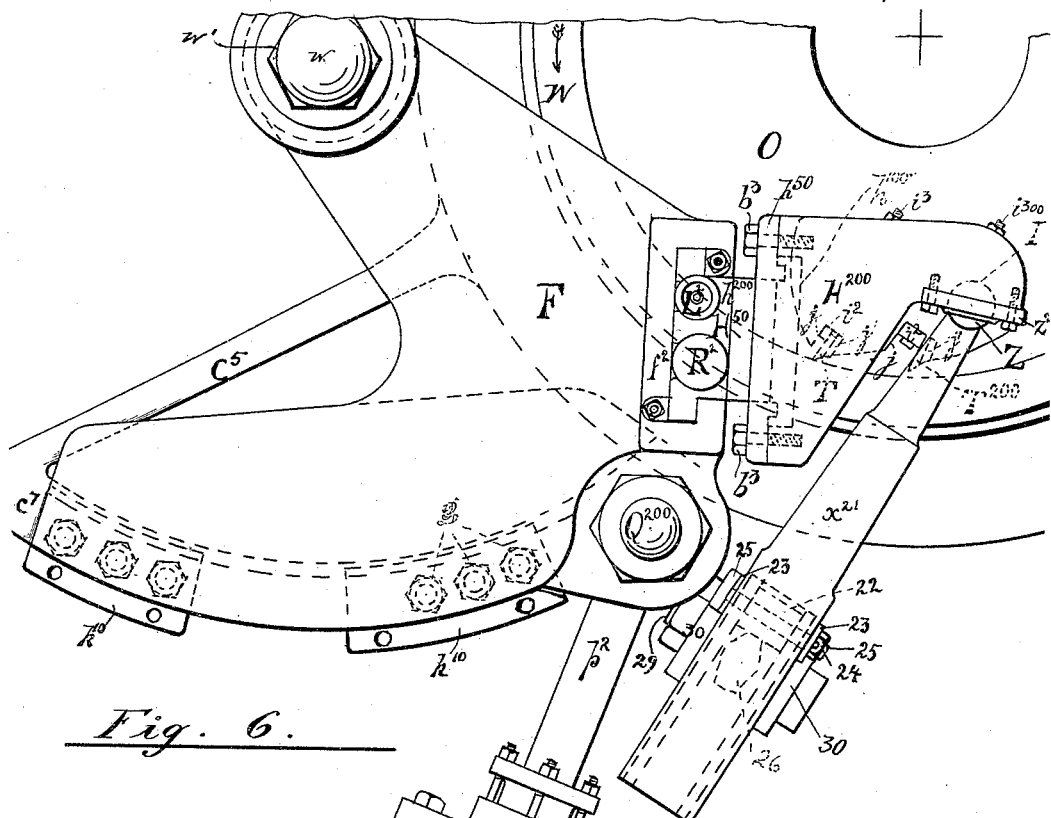
Fig. 6.
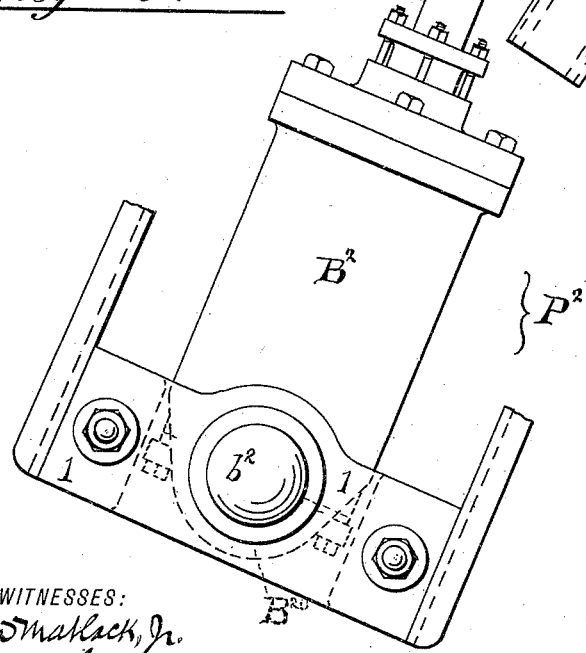
WITNESSES:
Joshua Matlack Jr.
Francis P. Matlack Jr.
INVENTOR
Frederick W. Taylor
BY H. W. Han Powl
ATTORNEY (No Model.) 6 Sheets—Sheet 6.
F. W. TAYLOR.
BORING AND TURNING MILL.
No. 448,277. Patented Mar. 17, 1891.
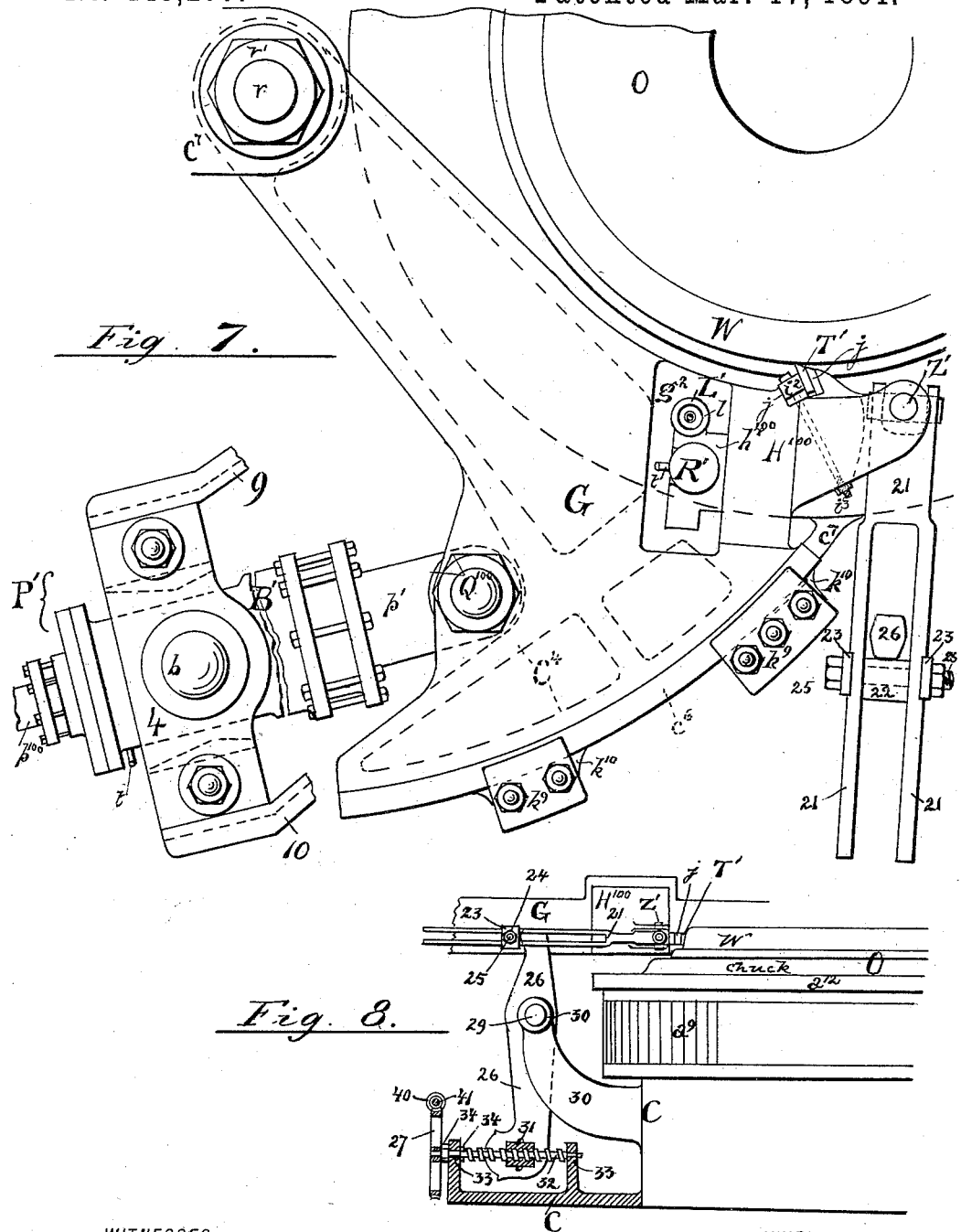
WITNESSES:
Joshua Matlack, Jr.
Francis N. Eastlack Jr.
INVENTOR
Frederick W. Taylor,
BY H. W. Hare Powel,
ATTORNEY

UNITED STATES PATENT OFFICE.

FREDERICK W. TAYLOR, OF PHILADELPHIA, PENNSYLVANIA.

BORING AND TURNING MILL.

SPECIFICATION forming part of Letters Patent No. 448,277, dated March 17, 1891.

Application filed December 11, 1889. Renewed January 15, 1891. Serial No. 377,818. (No model.)

*To all whom it may concern:*

Be it known that I, FREDERICK W. TAYLOR, a citizen of the United States, residing in the city and county of Philadelphia, in the State of Pennsylvania, have invented a certain new and useful Improvement in Boring and Turning Mills, of which the following is a specification.

Heretofore boring or upright turning mills have consisted ordinarily of a vertical mandrel crowned by a transverse "table" or "face-plate," the whole rotatably journaled and concentrically disposed within a circular frame having opposite upright standards bridged by a cross-head, upon which latter, by means of a traversing carriage or carriages, one or more tool-supporting slide-rests carry tools, drills, &c., much after the manner of a metal-planing machine; and, while continuous revolving instead of rectilinear reciprocating of their tables serves to distinguish these machines into distinct classes, the analogy between boring-mills and planing-machines becomes still more pronounced in such of these mills as are designed to take heavy cuts upon large work, for these mills, being now usually provided with an adjustable step to their mandrel-spindles, admit, when it is desired for increased steadiness in the action of their face-plate or table, of resting it upon an auxiliary bearing fashioned integral from the machine's frame, which latter, for this purpose, extends in an annular seat beneath such table's outer flange, and thereby affords it, as it were, a circular track on which to revolve. Moreover, the movable tool-supporting carriages, the slide-rests, and the feed-motion mechanisms of both classes of these machines (boring-mills and planers) are also usually so far identical that in both prismatic guides control the movements of the various sliding members which traverse across or are fed to and from their respective rotating and reciprocating tables with rectilinear movements, the general construction being to give broad soles and the most solid possible backing to the several sliding parts of which their tool-supports are composed, and these supports are, so far as I am aware, calculated to deliver the thrusts derivable from the tools they carry by other broad soles onto the more substantial backing of the machine's solid bed-bearing surfaces, as distinguished from discharging them onto V-guides and the rabbeted or undercut portions of their engaging and guiding parts. For these reasons, while two or more tool-supporting carriages are frequently placed upon the cross-head of a boring-mill and put into operation at the same time, the best practice has been, when operating at two points on opposite sides of the center of rotation, to call upon that tool which is backed up by the vertical bed-supports of the cross-head to meet the heavier duty, such as that of roughing or taking deep cuts, while the other tool, which works across the center of revolution, being subjected to strains in the opposite direction, and thereby having a tendency to be pulled off of or away from its supports, is, for fear of springing or destroying them, called on for the lighter acts of finishing, &c.; but as boring-mills, especially of the railway-wheel-tire-turning class, to which this invention has particular reference, may advantageously be called upon not only to support broad-nosed tools, but to act by the direct infeed of these, as distinguished from the common method of consecutive feedings alternating with the consecutive taking of cut after cut with narrow-nosed or sharp-pointed tools, they may thus be called upon to withstand tremendous strains and operate in a way which is almost unheard of in the planing-machines and lathes of more ordinary sort; yet, so far as I am aware, they are still built upon the common or planer-like base of construction above alluded to, and that is but ill adapted to resist without chatter or injurious digging into the body of the work, especially should the tool be used in a turned-over or support-facing way such as is hereinafter more particularly described.

Now the chief objects of my present invention are, first, in dispensing with the cross-head and giving free access to the face-plate or revolving table of a boring-mill to supplant such old mechanism by pivoted tool-supporting carriages adapted to be swung, deflected, and to develop feed-motions in their immediate tool-supporting parts in the method lately patented by me in the United States Patent Office, No. 387,121, of July 31, 1888; second, to distribute and fashion the mechanism of such improved mill so as to prevent as far as possible the shifting and dislocation of the work from its established center of rotation, and, by applying the principle of "cranked tools" to the tool-supporting parts themselves, (the swinging tool-carriages,) to thereby reduce the vibration and chatter of the tools they carry; third, to operate upon a maximum of surface, preferably at several points cotemporaneously, by stubby broad-nosed tools, all pivotally supported and acting with direct infeeds, each tool being controlled by hydraulic advancing screw-releasing mechanisms operating to effect feed motions in accordance with the method lately patented by me in the United States Patent No. 387,121, aforesaid; fourth, to give the tool-supporting carriage or carriages of my improved device a capacity for retreat from the range of the face-plate or table of the mill, or to return thereto, without necessarily disturbing the tool or its holder from the established adjustment effected by its immediate slide-rest members; fifth, to combine circular feed-motion mechanism with rectilinear, and, if need be, to incorporate circular or "swing" adjustment devices in the mechanism of the several tool-supports; sixth, to provide guide-soles and concentrically-disposed supports to maintain the pivoted sector-carriages in correct lateral alignment when in motion, as well as to thereby absorb strains, prevent vibration, and reduce the duty otherwise put upon their pivotal connections; seventh, to devise a suitable frame or housing wherein the whole may be both assembled and operated, together with such other novel features as are set forth by the following claims.

Figures 3, 3A:
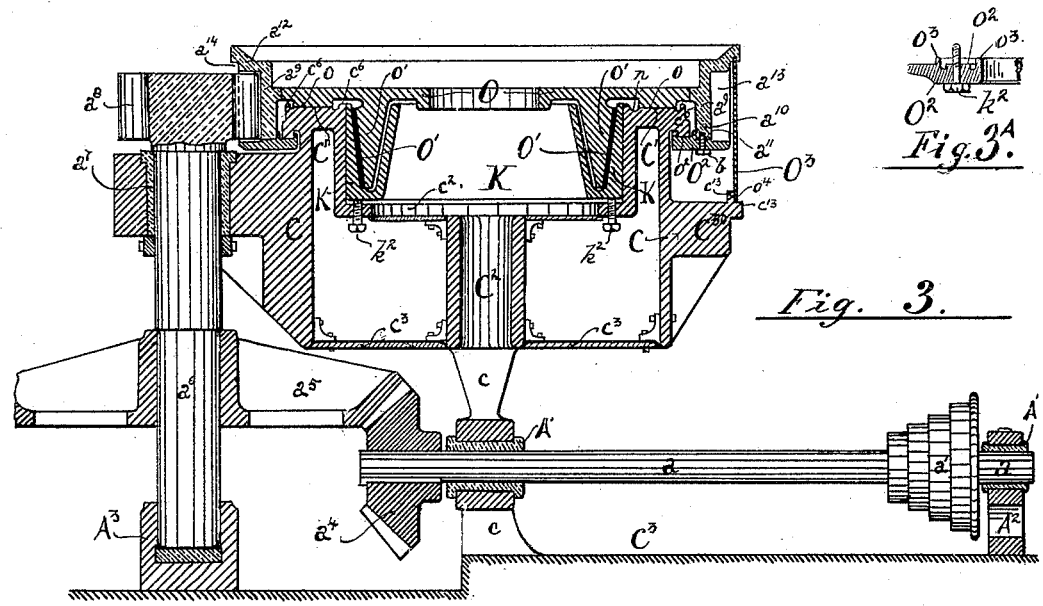
Figure 4:
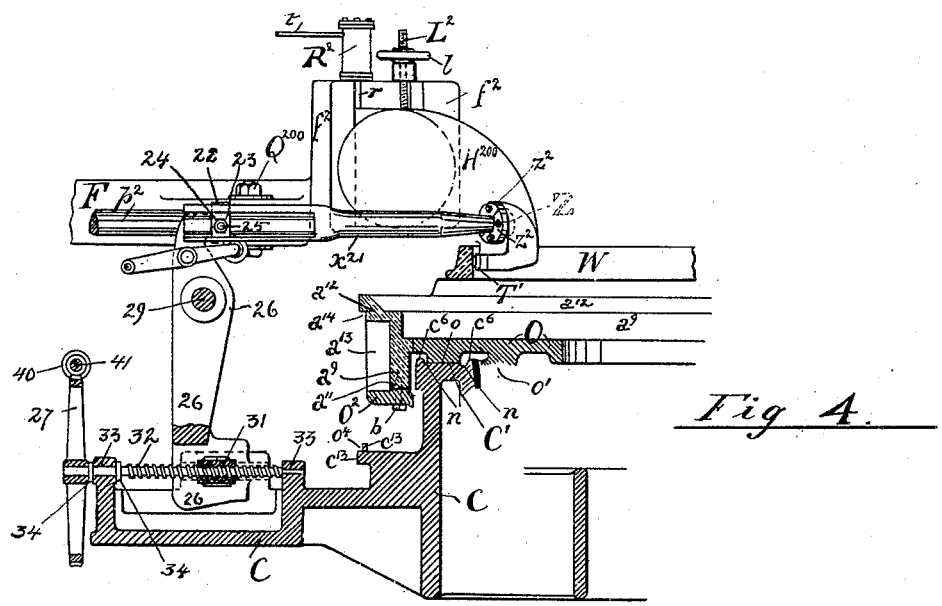
Figure 5:
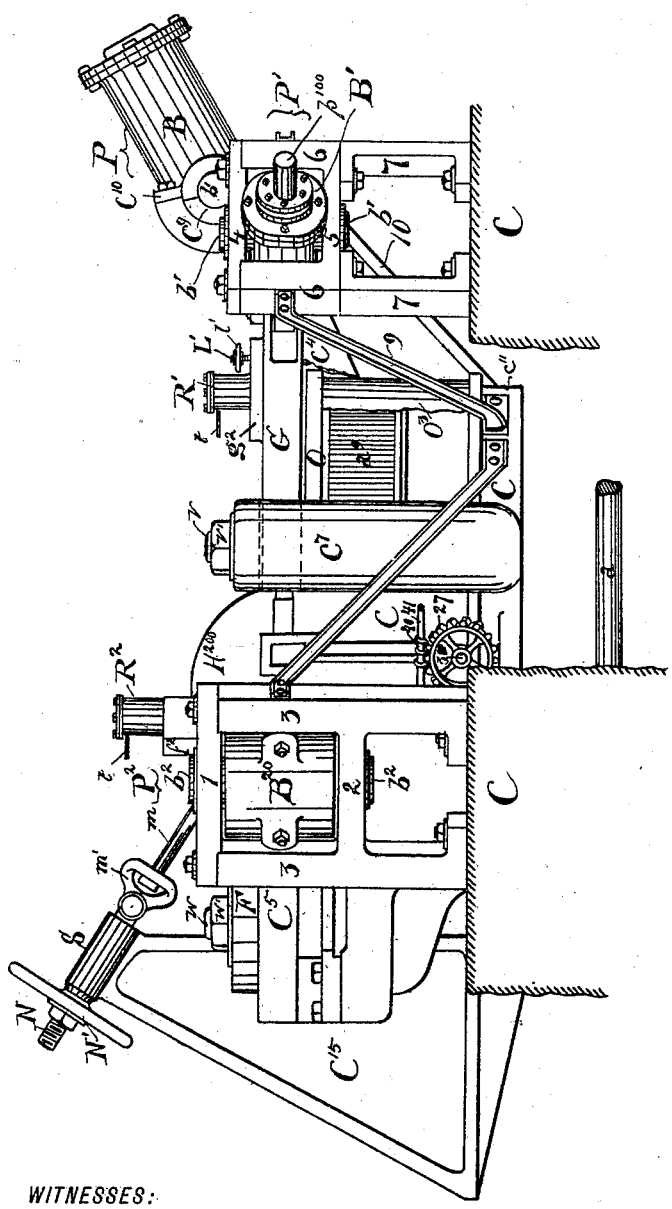

Reference now being had to the accompanying drawings, forming part of this specification, in which similar letters of reference indicate corresponding parts throughout the several figures, they will be found to illustrate my present invention as follows, to wit:

Figure 1 is a plan view of boring-mill provided with my improved hydraulic-ram-advancing, release-screw-feeding, swinging tool-carriage mechanism for "inside," (or "boring,") "outside," and "face-turning," respectively. Fig. 2 is a front elevation, partially in section, of the portion of the structure shown in Fig. 1, the scale being somewhat enlarged and the whole being illustrative of my improved facing-tool mechanism in its association with the lathe mechanism or table mandrel, and "power" back-gear-driving train of the mill proper. Fig. 3 is a median vertical section of the mill's rotative or "lathe" mechanism, divested of all swing-carriages and tool-supports, plane of section being denoted by line $x\ x$, Fig. 1. Fig. 4 is a detail in vertical side elevation, upon a somewhat enlarged scale, of releasing-screw and immediately connected moving parts and fixed frame portions (the latter being given in section on line $x'\ x'$, Fig. 1 of the inside tool) feeding mechanism. Fig. 5 is a side elevation or general view of machine, looking from a point near the upper right-hand corner of Fig. 1, as therein denoted by a bracketed sight arrow. Fig. 6 is a plan view of a fragment showing the pivoted inside or "boring" tool carriage, its supports, hydraulic-ram, carriage-deflective-advancing, and release-screw-feed-controlling mechanisms in their general association with the adjoining portion of the boring-mill bed. Fig. 7 is a similar plan view of another fragment comprising the outside or "turning" tool carriage, the scale, detail, and illustration being analogous to that shown in Fig. 6. Fig. 8 is a side elevation (upon the general scale of Fig. 2) partially in section, showing portion of release-screw mechanism of outside-tool carriage shown in Fig. 7. Fig. $3^A$ is a fragment of table "hold-down" ring, showing detail upon a somewhat enlarged scale.

In general in the drawings, A, Fig. 1, denotes the rotary or lathe-driving mechanism, which consists of the stepped or "cone" belt-pulley $a'$, fixed to the shaft $a$, journaled horizontally across the lower portion of the machine by the boxes A' A', supported, respectively, by the pillow-block $A^2$ and the central frame-pendant $c$. Just beyond this, $a$'s inner end carries fixed to it the miter spur-wheel $a^4$, Fig. 3. This spur, meshing with the back-gear train's miter-pinion $a^5$, serves to actuate the vertically-stepped counter-spindle $a^6$ in its bracket-housed bearing in the journal $a^7$ and step-bearing $A^3$, and, by its upper fast gear $a^8$, intermeshing with lathe-table's integral or preferably tire-like fixed cog-bearing rim $a^9$, thereby rotates it with great increase of power.

The lathe-table or face-plate O, which has preferably a central aperture, may be mounted, as boring and turning mill lathe-tables usually are, by a vertically-stepped mandrel—that is to say, substantially as the aforesaid back-gear train's counter-spindle $a^6$ is, just above described, to be stepped and journaled, or preferably, as illustrated in Fig. 3, by the combination of a circular marginal bed-bearing surface $o$, reposing upon a corresponding trackway C', (fashioned upon the circular upper rim of the main bed-frame C,) and a conical transverse or, generally speaking, downwardly-extending and preferably annular or "hollow" mandrel-cone O', bearing on a corresponding chambered and preferably laterally-guided vertically-adjustable mandrel-cone collar, also preferably hollow—viz., the cup-like step K—said step finding a support either directly upon the machine's frame or, in the preferred adjustable way, by the adjusting-bolts $k^2\ k^2$, screwed vertically through the annular frame-web $c^2$, said web being supported from above by the track-rim C' aforesaid, and centrally and beneath by the hollow columnar support $C^2$, which, with $c$, rises integral from the mill-frame's foot $C^3$. The weight of the rotative table O being in some cases sufficient to keep it in place, that weight may be relied upon for that purpose; but I preferably hold the table positively down to surface of track C' by means of a removable and adjustable opposing engagement between said table and the mill's fixed frame, such engaging device being also illustrated in Fig. 3, where the annular table-fastened drive-gear $a^9$ has its lower face $a^{11}$ made parallel to its upper surface and bears, removably and adjustably secured to it by bolts $b$, the hold-down ring $O^2$, which ring, projecting inward, fetches its upper inner surface $c^2$ into bearing-contact with the lower face $c^4$ of the downwardly-projecting L-shaped flange $c^5$. Rims $c^6 c^6$, rising on either side of the track-surface C' and intermediate marginal grooves $n\ n$, are, I also find, like the cup shape of the mandrel-cone stepcollar K, advantageous in forming gutters to prevent the escape of lubricants. Similar upstanding gutter-rims $o^3 o^3$ on the hold-down ring $o^2$ serve a similar duty for its bearing-surfaces, as well as materially assisting its proper adjustment and centering when assembling, &c.

The upper face of the rotative table O may be a plane surface or provided with a circumferential up standing curb, (see flange $a^{12}$, Fig. 3,) in which illustration such flange is the upper rim of the table's fixed embracing annular gear $a^9$. The farthest laterally-reaching member of this gear's L-shaped upper flange extends beyond the outer faces of the gear-teeth $a^{13}$ and forms a projection, which projection being recessed, as shown in profile at $a^{14}$, Fig. 3, affords, wi h the adjoining but free-standing thin sheet-metal hoop $O^3$, (which is secured to an angular recess $o^4$ between the L-shaped edge flanges $c^{13}$ $c^{13}$ of the main frame C,) a guard protective of the gear-teeth $a^{13}$ and embraced jointings. Other lateral extensions $C^4 C^5$ of the main frame C afford on their upper rims $c^6 c^7$ convenient steady guide-beds preventive of lateral vibrations in the swinging movements of the tool-carriages F G, which carry the parts immediately supporting the inside (or boring) and outside (or turning) tools $T' T^2$, respectively. Said carriages' screw-capped pivots $v\ w$ arise vertically from the columnar frame-extensions $C^6 C^7$, (see Figs. 1, 2, 6, and 7,) upon which the nuts $v' w'$ severally retain them with freedom for their pivotal movements and afford centers of rotation about which those carriages F G may be swung in and out of the swing range of the mill-table O, and preferably opposite and about midway between these points of pivotal attachment for the swing-carriages F G, I secure, preferably by bolting to the outside wall-extension $c^{11}$ of the main frame C, other sub-extensions of the frame, viz:

The brackets $C^8 C^8$, Fig. 2, which carry the "facing-tool" (T's) swing-carriage pivot, the trunnion $u$, in bearings $c^8 c^8$, the screw-bolt character of which pivot is, I find, a convenient one for assembling upon it the facing-carriage $e$, which carriage, consisting of the lever-arms $e'$ Q and cross-head $q$, Fig. 1, is in turn pivotally connected by a knuckle-joint (fork Q' and pivot $Q^2$) with the piston or ram-head $p$ of an oscillating hydraulic ram P, Fig. 2, the cylinder B of which having integral transverse trunnions $b\ b$, paralleling the pivot $u$, is journaled in bearings $C^9 C^9$ formed upon the outer upper extremities of said brackets $C^8 C^8$, and there the ram is kept to place by the removably-bolted trunnion-straps $C^{10} C^{10}$, the whole arrangement and relative distribution of these parts being such (see Figs. 1 and 2) that the facing-tool carriage $e$ shall vibrate on the working of the ram P in a plane transverse to the lathe-table O, as well as to range its cross-head $q$ generally to and fro between that table's margin and center. A further sub-extension of the frame $C^{12}$, Figs. 1 and 2, I also preferably fashion, to offer a bolting guide-bed, by its vertical horizontally-grooved face $C^{14}$, to the tongue-provided attaching-base $C^{13}$ of a webbed bracket $C^{12}$. The summit of this bracket carries a hollow sleeve S, the orifice $s$ in which trends toward the facing-carriage cross-head $q$ when the latter is in operative position. The whole affords a convenient laterally-adjustable abutment for a releasing-screw mechanism to co-operate with the ram P in feeding the facing-tool's swinging supports toward the mill's rotative table O, for upon the cross-head's ($q$'s) prismatic guide-flanges $q'\ q'$ a tool-holder H, preferably of the "turret" or many-tool-bearing swiveling sort, is mounted, as illustrated in Figs. 1 and 2, by a central flange-headed pivot $h$ and said pivot's integral or rigidly-attached rabbet-grooved slide-rest block $h^4$. The grooved foot H' of this block, fitting in the usual manner to the slideways of the guide-flanges $q'\ q'$, has attached to its upper outer side an "advancing mechanism," in this case the plunger or ram-head $r$ of the hydraulic ram R, Fig. 1, which ram is located and fixed in line with H' upon the adjoining outer face of the cross-head $q$, and attached to this slide-rest block's ($h^4$'s) lower side body, paralleling the advancing ram R, is a "releasing mechanism," consisting here of the releasing-screw L, which, journaled in a suitable bearing in $q$, thence passes onward and engages with a correspondingly screw-threaded orifice in $h^4$ as a nut, whereby the traverse of the slide-rest block $h^4$ and tool-holder H along the rectilinear cross-head $q$ may be effected with a deflective release-screw feed-motion in accordance with the method patented to me July 31, 1888, in United States Patent No. 387,121. The release-screw hand-wheel $l$ and the ram-feed conduit $t$, Fig. 5, associated with this facing-tool slide-rest, afford avenues for the forcing and restraining power necessary to operate such contrivance, as also do the hand-wheels $l\ l$ and conduits $t\ t$, not only in the last-above-described mechanism, but also for the kindred ones of F and G, afterward to be described. This method of feeding the rectilinearly-guided slide-blocks, as $h^4$, is, in fact, closely allied to the circular movement with which the above-described advancing mechanism of the pivoted facing-tool carriage E is calculated by the further equipment of carriage $e$ to move its active tool into the work—viz., the tools borne by this carriage E being secured by the wedge-heads $i$ $i^2$ of the tool-holder-piercing binding-bolts $i^3$, Fig. 6, to their respective jaws $j j'$ to a turret H, and that turret turned about its pivot $h$ until a tool T has, first, its cutting-edge at such an angle to the bed-surface as it is desired to face the work W with, and, second, its cutting-face turned toward or in the direction of the work's coming, (indicated by an arrow on the work in all the figures), and in such position locked from further swiveling about pivot $h$, as by the screwing into a dial-pit sunk into the adjoining slide-block face of the point of a localizing directrix-bolt $b^5$, Fig. 2. Then, such equipment and arrangement of tool-supporting parts being made on the cross-head $q$, they are operatively connected to a releasing mechanism of the sort above referred to preferably as follows: An outward extension of the pivot $h$ is fashioned into a ring M, Fig. 2, and that ring is held by the swivel-shanked hook $m$. The shackle $m'$ of the swivel-hook is transversely pivoted to the adjoining end of a holdfast-screw N. The whole thus constitutes a feed-governing mechanism, for this screw's hand-wheel nut N′ bears on the outer face of the sleeve S, through the orifice of which N is adapted to slide endwise. The whole is thus controllably engaged to the laterally-adjustable abutment-bracket $C^{15}$. Thus the whole facing-tool-carriage system, wherever the slide-rest block $h^4$ may be at work, from table margin to table center, becomes susceptible of initial deflection and "releasing" feed motions in circular paths of the sort above alluded to. For the reduction of vibration, lateral webs $e^2$ $e^2$, Fig. 1, help to brace the cross-guide $q$, and in those cases when the play afforded by the shackling of the releasing-hook $m$ to the tool-holder pivot-ring M for sidewise motion parallel to the guide of $q$ is not sufficient to admit of the more considerable feed movements of the slide-rest block $h^4$ along the carriage cross-head $q$, then the anchoring-bolts $b^{20}$, Fig. 2, being slacked up the longitudinal slots $i^{10}$ $i^{10}$ of $C^{15}$, through which these bolts $b^{20}$ pass, afford the bracket $C^{15}$ and all the parts it carries opportunity for concurrent adjustment movements along its horizontal guideways $i^9$ $i^9$, to which end this bracket $C^{15}$ may be fitted with a traversing screw and nut $l^6$ $l^7$, engaging with it on the one hand and its bed-extension base $C^{14}$ on the other, as indicated in end view of said screw and nut in Fig. 2, and, finally, in tracing out this identity of the method of feeding it is manifested most graphically by the illustrations forming part of this specification.

For the relative distribution of the trunnion $u$, (which trunnion is the fixed pivotal support of the concurrently-movable circularly-swinging compound tool-support E Q $q$ H) said movable tool-support, the work W, and tool T, as therein shown and hereinabove described, are such that the resultant or (to quote from my aforesaid United States Patent No. 387,121) "center" line of pressure developed by their advancing mechanism, the ram P, in forcing the tool T to advance, and the resultant line or "center of pressure," which the holdfast and on occasion release-screw or (to again quote from my said patent) "rate-governing" mechanism S N N′ $m'$ $m$ develops through its tool-holder attachment M upon said tool-holder H, are such as when concurrently developed to lie out of the same line, and to produce as their resultant a center or line of pressure which approximates, if it does not actually coincide with, the resultant line of pressure which the tool T, supported by E Q $q$ H, would generate should it be forced, supported, as it is, to penetrate into the body of the work W. Thus the requisite conditions for the initial deflection and "release" feed-motion peculiar to my said patented method are obtainable. Moreover, such conditions are also embodied in the inside and outside tool-supporting feed-controlling mechanisms herein also embodied, and they also respectively operate to the like end, yet as the carriages G F swing in planes approximately parallel to and close above the surface of the table O, but are to act, respectively, on the outside and inside portions of the work, (the annular tire W,) their advancing ram systems P′ P² are turned at right angles to the facing-tool's carriage-ram P, as well as calculated to work in opposite directions the one P′ to the other P². So, too, to meet the peculiar nature of their respective sorts of work I have contrived to distribute, fashion, and place these tools' movable carriage-supports, fixed pivots, ram-advancing, and more highly-elaborated holdfast screw-releasing or rate-governing mechanisms, as shown in Figs. 1 and 4 to 8, inclusive, as follows, to wit: These carriages F G being pivoted at $w$ $v$, respectively, and marginally supported by the mill's bed-extension rims $c^6$ $c^7$, (which rims are also preferably fitted with carriage hold-down clips $k^9$ $k^9$, Fig. 7, adjustably bolted to fixed chairs $k^{10}$ $k^{10}$, carried on the upper outer portions of the extensions $C^4$ $C^5$,) as above described, are further equipped each with substantially similar ram-advancing, holdfast release-screw, rate-governing mechanisms controlling the feed-movements of their tools—that is, they are fitted each with equipments similar in their deflective and feed actions to those which, as above mentioned, control the movable facing-tool support or carriage E; but yet more elaborate in detail, and, as shown in the illustrations, especially Figs. 4 to 8, inclusive, these carriages, both F and G, are contrived also to be without extensions, such as Q, on the swinging carriage E, for their tool-supporting rectilinearly-guided slide-rest members are borne laterally on their carriage-bodies proper in integral vertically-disposed rabbet-grooved guideways $g^2$ $f^2$, and each of them G F is equipped, in addition to their aforesaid circular "in-feeding" hydraulic-ram-advancing holdfast screw-releasing, rate-governing feed mechanisms P' P$^2$, &c., with slide-rest traverse-feed mechanism similar to that which controls the slide-block $h^4$ on the cross-head $q$—that is, as indicated in the several figures disclosing the structural detail of G and F, said sliding carriages are so equipped each to the like end by their respective slide-rest sliding blocks $h^{100}$ $h^{200}$, Fig. 6, advancing-ram cylinders R' R$^2$, and hand-wheel-provided release-screws L' L$^2$, Figs. 6 and 7. These carriages' tool-holders H$^{100}$ H$^{200}$, respectively, too, as illustrated in Figs. 1, 6, and 7, although not turrets in the sense of holding-tools disposed as radii to their axes, may be pivotally connected to their respective carriage-supports, as H$^{200}$, Fig. 6, is to F—that is to say, connected by the inter-rabbeted flange-headed pivot-post H$^{50}$, Fig. 6, which pivot, projecting integral from the outer face of slide-block $h^{200}$, is by the registering (inter-rabbeted) annular cap-plate $h^{50}$ and cap-screw bolts $b^3$ $b^3$ adjustably securable to the tool-holder H$^{200}$, whereby the latter can by tightening said cap-bolts be held fixed at any desired angular divergence obtainable about the said slide-rest pivot-post H$^{50}$, otherwise the slackening of said bolts suffices for a release and readjustment of said tool-holder whenever required. Moreover, both the tool-holders H$^{100}$ H$^{200}$ have, similar to the turret tool-holder H aforesaid, bolt-drawn tool-wedges $i^2$ $i^2$ and converging tool-holding jaw-faces $j$ $j'$; but instead of a single tool-receiving mouth, as the tool-holder H$^{100}$ has, these tool-holders may have more than one arranged tandemwise. This is illustrated in Fig. 6, where, besides the tool P$^2$, held in contact with the inner face or "bore" of the tire W, the tool-holder H$^{200}$ has on its (in respect to the axis of the table O) retreating inner face and between the tool T$^2$ and the spherical abutment-seat I of the release-screw link $x^{21}$ a second tool T$^{200}$, wedged into a similar jaw-mouth. However, the edge of this second tool T$^{200}$, by reason of its said more retreated position, can only come into action on the bore of the work when, either on account of dullness, breakage, &c., the mill-driver has, by releasing the bolt I$^3$ and wedge $i^2$, withdrawn the first tool T$^2$; and such a possibility (of having a fresh tool at work without disturbing the established relation of any other parts, save that of the release of bolt $i^2$ and removal of tool T$^2$, coupled with a slight additional onward *quasi* feed movement of the carriage F until the edge of the substitute ready-held tool T T$^{200}$ shall actually come into contact with the work) affords a striking advantage of my present invention. For while, as set forth in the above enumerated objects of my present invention, free access to the work-table O is of special intent; yet another of my objects is, even in making the retreat of the movable tool-supports not only swift, ready, and pivotal when necessary to contrive for these capacities to be required as seldom as possible by reason of the ready-handling magazine sort of tool equipment which my improved mill's preferred sort of slide-rests are supplied with; and, lastly, as respects the mechanism controlling the feed-motion advances of carriages F and G, their rate-governing mechanisms, save for the compression of the force-transmitting parts of one and the tension of those of the other, are alike, and therefore I only separate their following descriptions so far as is necessary to point out, first, that the tendency to advance developed at any time in the inside-tool-supporting carriage F in its marginally-guided circular path, so as to fetch the tool T, which it bears, toward the adjoining inner face of the annular piece of work W, which tendency may be developed by a retreat within its cylinder B$^2$ under water-pressure introduced through the cylinder-conduit $t$ of the ram-plunger $p^2$ and its consequent outward dragging of its pivotally carriage-connected cross-head Q$^{200}$, is either met and restrained or else permitted and controlled as to rate of advance by the controllable opposition of the spherical head Z of the compression link $x^{21}$, which link-head, being held to a seat I in the outer tool-holder extension of the carriage F by the removably-bolted split collar-plates $z^2$ $z^2$, forms therewith a ball joint, and has its outward thrusting tendencies (received from said tool-holder seat I) in turn controlled by an adjustably-clamping endwise-rangeable buffer stop-block $x^{22}$, which block, save for its banking on the inner instead of the outer side of the pivoted lever-arm 26, is in other respects the counterpart both in form and duty of the buffer stop-block 22, which I also contrive by a bolt and washers hereinafter described to be adjustably clampable at any desired part of its range along the forked extremity of the tension of let-off link 21, and then, (referring to the matter at the end of the last prior paragraph,) second, to point out that, save for these reverses, the motions of the following-described parts produce like results in the movable parts they control. I therefore now conclude their further detail by, in substance, quoting as applicable for both the following from the specification of my patent aforesaid, viz: Said links are connected each at one end by a swinging joint (the ball joint of $x^{21}$ aforesaid and the "Hook's joint cross-head Z' of link 21) to the vertical slide-block's tool-holder extensions H$^{100}$ H$^{200}$ at a greater distance, respectively, from the guiding-surfaces of their respective slide-blocks" $h^{100}$ $h^{200}$ guide parts, which fit in their respective slideways $f^2$ $g^2$ in the swinging carriages F G, than the distance of their tools from said guiding-surfaces. The connecting-link, casting or forging in each case, whether $x^{21}$ or 21, is also provided with a movable buffer or stop-block 22, which, as above mentioned, can be moved into different positions along said connecting-link and clamped fast thereto in any desired position by means of a bolt 25, nut 24 engaging therewith, and the two washers 23 23. This buffer stop-block is shown, Figs. 6 and 7, pressing against the upper arm of a double-armed lever 26. This lever pivots upon and is supported by a pin 29, fitting in a forked bearing 30, projecting from the main frame of the mill. The lower arm of the lever 26 is also forked, and carries a nut 31, Fig. 4. Said nut has on each side a trunnion fitting in a suitable radial slot, as a bearing in either side of said lever's forked lower arm in such way that the nut may remain horizontal and follow its engaged screw as the lever moves out of a perpendicular position, the said nut, speaking broadly, as respects its duty when in motion in either the case of F or G's rate-governing mechanism, being similar to the hand-wheel nut N' when rotated to let off the holdfast-screw N above mentioned; but these nuts 31 31, each being preferably of very rapid pitch, are each engaged upon corresponding rapid pitch, registering release-screws 32, which are fitted to rotate in bearings 33, fixed to the main frame and provided with collars 34, by which their end motion is prevented. Each of said nuts 31 is thereby in each of said cases now being jointly described (see Figs. 4, 6, 7, and 8) susceptible (if powerfully controlled) of a much more accurate sort of actuation than the mere hand sort for which the equipment N N' of the facing-tool carriage $e$ is in this respect alone illustrated. For said steep angular pitch of the release-screws 32 32 and the proportions of their collars 34 are in both cases preferably such that either, when pressure is brought upon the nut, the screw will almost but not quite turn, or that the pressure of the nut will just insure the not too easy turning of the screw. There then are established in each of these rate-governing mechanisms conditions which remove all doubt as to whether it may require a slight push to start the thus contrived feed-motion mechanism to working or a pull to hold it fast or prevent it; and to effect such pull or push, whichever it may be, in a self-acting way I further preferably mount upon the end of the releasing-screws 32 fixed worm-wheels 27, against each of which worm-wheels a rotatably journaled tangent-screw 40 engages and serves by its shaft and any suitable known "in-and-out-of-gear" clutch mechanism to communicate when required with the main mill-table drive-gear train, and transmit thence a feed-developing force in a self-acting way. (Such connections with the table drive-gear train, however, are not illustrated in the figures for fear of confusion of outline.) Otherwise the worm-shaft 41 may be operatively connected to a hand-crank and restrained or rotated by the mill-operator at will. In short, as the operation of the hand-wheel N', Fig. 5, is obviously incorporated with the hereinabove description of it, and as the operation of the ram $P^2$ and link $x^{21}$ are simply in reverse direction to the ram P' and link 21, it is only necessary to here state that the operation of the feed mechanism connected with the pivotally-connected laterally and marginally-guided tool-supporting carriage G is as follows, for having described it the operation of the kindred mechanism connected with carriage F goes without saying, viz: Assuming, first, that the tool T has been moved to within a short distance of the outside or unturned tread of the tire-blank W, the upper part of the lever 26 should then be slightly farther away from the said work W than it is represented to be in Fig. 8; second, the buffer or stop-block 22, Fig. 6, has been rigidly clamped to the connecting-link 21 and also brought to a firm bearing against the upper end of said lever 26, Fig. 8, and, third, that state of affairs existing, that liquid or gas has been introduced under pressure to the back of the cylinder B, as by its conduit $t$, so as to produce a pressure upon the ram-piston area thereof tending to force said ram-piston toward the front of the cylinder, and so of course to force its integral protruding plunger-extension $p$ toward the carriage G. Then the advancing tendency being thence transmitted to this carriages's body by the ram-plunger's cross-head $Q^{100}$, Fig. 7, which head is pivotally but preferably removably attached to and embraced thereby, there is thus induced, if need be, an enormously-heavy pressure upon the circularly-sliding carriage G, and if not opposed and restrained such advancing force must cause G to swing in its circular marginally-guided path, and at all events, even if opposed, it tends so to force and swing both it, and with it the slide-rest and tool-holder which are attached to it, toward the work W. Since, however, as above explained, the connecting-link 21 is fastened at one end $z'$ to the slide-rest borne tool-holder $H^{100}$ and has a bearing by block 22 against the upper arm of the lever 26, the carriage G is thereby actually opposed and prevented from moving toward the work until such time as the lower end of said lever is allowed to move by a turning of its tangent-screw 40, for on such turning of 40 both worm-wheel 27 and screw 32 revolve, and this travels the lever-controlling nut 31 lengthwise along said latter screw's body, a position rest being possible by holding said screw 32 at any point; otherwise, the speed of said nut's passage endwise of screw 32 being determined by the rate of its said screw's rotation, the whole acts as an escapement, and thereby, on connection with the table drive-gear, becomes self-acting and automatically productive of feed movements in the movable tool-supporting parts of the sort predicated, in which connection it will also be observed that by the combined strains of the advancing (and here at will self-acting) rate-governing mechanism, as above described, both the swinging carriage G and the vertical sliding block $H^{100}$ can be put under a heavy strain, which strain can readily be made as great if not greater than the pressure which the tool in cutting would induce upon the said carriage G and slide-block $H^{100}$, thus causing them both to deflect in the same direction and to an extent as great or greater than they would be caused to deflect by the pressure of the work upon the tool as well as also resulting in the "taking up" of the lost motion from between the jointings of slide-rest $H^{100}$, carriage G, and carriage-pivot $v$ to the same extent as, or to an even greater extent than, the lost motion will be taken up from between said jointings by the pressure of the work upon the tool. Ordinarily in using my mill this deflection and take-up in the jointings can take place by the co-operation of said two devices acting concurrently upon these movable tool-supports before the tool and work are actually brought into contact; but this also being a state which these same causative mechanisms can produce upon said sliding tool-supports whether in motion or at rest it becomes possible by their co-operation to bring the tool to bear upon the work in the act of feeding without disturbing the sliding supports which fetch it there from a pre-established designed condition wherein both the inherent elasticity and possible lost motions of said movable supports have been eliminated, thus preventing chatter and imperfect work to a marked degree.

I have shown the transversely-adjustable marginal carriage guide-clips $k^9$ $k^9$ assembled with the carriage G, Figs. 1 and 7; but in Figs. 1 and 6 I have shown the carriage F with them removed, though their situation is therein indicated by broken outlines and their clamping-bolt's tapped holes in their respective chairs $k^{10}$ $k^{10}$, gib-bolts $g$ $g$, adapted to screw through said guide-clips and impinge on the underlying circular guide-flanges of F, being indicated by dotted outlines.

As the ram $P^2$, Fig. 1, of the carriage F is calculated to work when urging the tool to the work for a feed by drawing its plunger outward from the region of O toward its trunnions, its cylinder $B^2$ is equipped with said trunnions $b^2$ $b^2$ upon its outer or rear extremity, and said trunnions, preferably bolted to it ($B^2$) by a detachable breech-strap $B^{20}$, Fig. 5, are borne in journals bedded in the cross-pieces 1 and 2, which connect the diagonally-braced frame-uprights 3 3, whereas the advancing ram P' of the carriage G, being calculated to urge its tool to the work with thrusts directed inward or toward the region of the rotative work-carrying table O, has its ram's cylinder B', like that of the facing-tool carriage E, pivotally connected by trunnions $b'$ $b'$ near its middle body to frame-extensions, the horizontal trunnion-bearing cross-pieces 4 5. These journal-bearing cross-pieces 4 5 in their turn are supported and braced to the mill's main frame by uprights 6 7 and strut-braces 9 10; also, in order to insure the correct alignment of these ram-plungers and the more ready swinging of their associated cylinders, whether operated to cause feed-motion advances toward the work or to their still greater range outward for the sake of retreating the carriages E F G clear of the table O, they may, like the one pivotally connected with G, have extensions $p^{100}$ of their acting ram-plungers proper passed backward through suitable glandular-packed orifices from their cylinders' ends. However, as to these extensions, the ram-conduits $t$ $t$, the ram-valves, &c., they are details well understood as to rams generally and need no further description here, it being only remarked that, as shown in the illustration herewith, these rams' plungers should preferably be applied to the tool-carriages' bodies by detachable pivotal connections and the centers of pressure of said connections preferably be located at or near the said carriages' margins. (See carriages F G in this respect.) Otherwise if, as with carriage E, such marginal attachment is inconvenient to effect, it may be accomplished across the carriage's center of rotation (pivotal swinging) by a suitable extension of the carriage, as E', and effecting an attachment of the advancing mechanism thereto at a corresponding distance to that of "at or near" said carriage's tool-bearing margin proper, and, in conclusion, I here point out that in addition to the many advantages above enumerated and manifestly incident to my improved boring-mill, as herein set forth and illustrated, the possibility which the general distribution and character thereof affords the workman or mill-driver to readily approach the mill-table—say by a low bridge, or a mere plank placed from tool-carriage to tool-carriage—when they are at work, also forms a very striking advantage of it; but now, leaving the description and operations as sufficiently specified.

What I desire to secure by Letters Patent of the United States and hereby claim, is—

1. The combination, with the rotative boring-mill table, of a pivoted tool-supporting carriage, a reciprocating ram, and operative mechanism whereby said ram may be advanced and exert a pressure on said carriage which tends in the direction in which it is desired the said carriage shall advance, and a holdback-screw with nut and abutments, substantially as and for the purposes hereinbefore described.

2. The combination, with the rotative boring-mill table, of a tool-supporting carriage pivoted to swing from "clear" to operative positions ranging within the swing range of said table's rotation, a tool-holder formed on or attached to said carriage, an advancing ram, operative mechanism whereby said ram may be advanced and exert a pressure on said carriage tending in the direction in which it is desired said carriage shall advance crosswise of said table toward the work thereon carried, and a holdback-screw with nut and abutments, substantially as and for the purposes hereinbefore described.

3. The combination of the rotative boring-mill table with a pivoted circularly-movable tool-supporting carriage, a reciprocating-ram fixed in relation to said carriage and table, operative mechanism whereby said ram may be advanced and exert a pressure which tends in the direction in which it is desired that said tool-supporting carriage shall advance, a holdback-screw with nut and abutments, and any suitable known mechanical connections whereby said nut and screw may be rotated in relation the one to the other in a self-acting way and permit feed movements in said tool-supporting carriage, substantially as and for the purposes hereinbefore described.

4. The combination, with a rotative boring-mill table, of a pivoted tool-supporting carriage provided at or near its free or swinging margin with a guide part or parts, a relatively-fixed guideway therefor, clamps by which the tool-carriage may be firmly secured when the tool has been brought into the desired position in relation to the work, and a reciprocating ram and operative mechanism whereby said ram may be advanced and may exert a pressure on said carriage which will tend in the direction in which it is desired said carriage shall advance, the whole substantially as and for the purposes hereinbefore described.

5. The combination, with the rotative boring-mill table, of a pivoted tool-supporting carriage provided at or near its free or swinging margin with a guide part or parts, a relatively-fixed lateral guideway therefor, a reciprocating ram, operative mechanism whereby said ram may be advanced and exert a pressure upon said tool-supporting carriage which tends to move it in the direction in which it is desired that said tool-support shall advance, and a holdback-screw with nut and abutments, as described, the said carriage's pivotal connections and tool-supporting part being so located in respect not only to each other, but also to the said advancing ram and holdback screw and nut, that the resultant center line of pressure produced by the joint advancing tendency of the ram on the one hand and the holdback nut and screw as a restraining or releasing stress on the other shall tend to deflect and move said carriage in substantially the same direction as said carriage would be deflected and moved on forcing its tool to a cut in the work, substantially as and for the purposes hereinbefore described.

6. The combination, with the rotative boring-mill table, of a pivoted tool-supporting carriage provided upon its free or swinging margin with a guide part or guide parts, a relatively-fixed lateral guideway therefor, a tool-holder pivotally connected to said carriage, a reciprocating ram, operative mechanism whereby said ram may be advanced and exert a pressure upon said tool-supporting carriage which tends to move it in the direction in which it is desired that said tool-support shall advance in the said carriage's pivotal connection proper, and said tool-supporting part being so distributed and located that the reaction of the work upon the tool when being fed into or cutting a chip from said work shall tend in a direction outward and away from the portion of the work actually operated upon, substantially as and for the purposes hereinbefore described.

7. The combination, with the rotative boring-mill table, of a tool-supporting carriage pivoted to swing from clear to and within said table's swing range, said carriage having at or near its free or swing margin a guide part or parts, a relatively-fixed guideway therefor, said carriage being provided with a slide-rest's slide-block, guideways formed on or integral therein, a slide-rest block adapted to slide and be fed therein in usual way and carry a tool-holder, a tool-holder formed on or attached to said slide-block and adapted to support and operate an outside or turning tool, an advancing ram pivotally supported to said mill's frame on one hand and said carriage-body on the other, operative mechanism whereby said ram may be advanced and exert a pressure on said carriage, a holdback-screw with nut and abutments pivotally connected to said tool-holder, the relative position of said carriage's pivotal connections and said rams and said holdback-screw's carriage and tool-holder connections, respectively, treat the resultant line of pressure due to their joint actions (the one advancing, the other restraining) may lie in approximately the same line and be directed in the same outward way from the work, as the work would tend to deflect and move the jointed supports of the turning-tool so supported should said tool's edge be penetrated into the body of the work in coming to or actually taking a chip, substantially as and for the purposes hereinbefore described.

8. The combination, with the rotative boring-mill table, of a pivoted tool-supporting carriage, a reciprocating ram, operative mechanism whereby said ram may be advanced and exert a pressure on said carriage which tends in the direction in which it is desired the said carriage shall advance, a holdback-screw of rapid pitch with corresponding nut, as described, abutments, and suitable known mechanical connections whereby said nut may be used to release, arrest, or rotatably control motion in said holdback mechanism, substantially as and for the purposes hereinbefore described.

9. The combination, with the rotative boring-mill table, of two or more pivoted tool-supporting carriages adapted to swing from clear to and within operative range of said table's swing, a reciprocating ram for each of said carriages, and operative mechanism whereby said rams may be advanced and exert pressure on said carriages, respectively, said pressure in each case tending in the direction in which it is desired the said carriage shall advance, and holdback-screws with nuts and abutments for each of said carriages, the whole operative substantially as and for the purposes hereinbefore described.

10. The combination, with the rotative boring-mill table, of a tool-supporting carriage pivoted to swing to and within said table's swing range, a tool-holder formed on or attached to said carriage and adapted to support and operate an inside or boring tool, an advancing ram and operative mechanism whereby said ram may exert a pressure on said carriage which tends in the direction in which it is desired the said carriage shall advance crosswise of said table as well as outward from its axis and toward the bore of the work which may be carried thereon, and a holdback-screw with nut and abutments adapted to act as releasing mechanism for said ram-advanceable carriage, substantially as and for the purposes hereinbefore described.

11. The combination, with the rotative boring-mill table, of two pivoted tool-supporting carriages adapted to swing across said table's swing range and carry the one an inside or boring tool, the other an outside or turning tool, a reciprocating ram for each of said carriages, and operative mechanism whereby said rams may be advanced and exert pressures on said carriages, respectively, said pressure in each case tending in the direction in which it is desired its respective carriage shall advance, and holdback-screws with nuts and abutment-bearings for each of said carriages, the whole operative substantially as and for the purposes hereinbefore described.

12. The combination, with the rotative boring-mill table, of two or more pivoted tool-supporting carriages severally provided with guide parts at or near their respective free or swinging margins, relatively-fixed guides operative to maintain said carriages by their said guide parts with lateral steadiness in their swinging movements, a reciprocating ram for each of said carriages, operative mechanism whereby said rams may be advanced and exert center lines of pressure on said carriages which tend in the directions in which it is severally desired the said carriages shall advance; and holdback-screws with nuts and abutments for each of said carriages, the relative distributions of said carriages' tool-holding parts and pivots, not only in relation to themselves, but also in relation to the respective locations of their several rams and releasing mechanisms, being such that the center line of pressure due to the advancing tendency of each of said rams and the center line of pressure developed by the holdback or opposing stress of said releasing mechanisms corresponding therewith shall in the case of each of said carriages produce when mutually exerted a resultant line of pressure and deflection which shall be in approximately the same direction and to the same extent as that which the tool so supported would cause its said pivoted tool-supporting carriage to deflect should said tool be penetrated into the body of the work, substantially as and for the purposes hereinbefore described.

13. The combination, with a rotative boring-mill table, of two or more pivoted tool-supporting carriages severally provided at or near their respective free or swinging margins with guide parts, relatively-fixed guideways therefor, clamps by which the several tool-carriages may be firmly secured when their respective tools have been brought into the desired position with relation to the work, a reciprocating ram for each of the said carriages, operative mechanism whereby said rams may be advanced and may exert pressure on said carriages which will tend in the direction in which it is desired said carriages shall advance, holdback-screws with nuts and abutments for each of said carriages, and suitable known mechanical connections whereby said nuts and screws may be rotated in relation to each other and may permit feed movements in said tool-supporting carriages, the whole substantially as and for the purposes hereinbefore described.

14. The combination, with the rotative boring-mill table with a pivoted tool-supporting carriage adapted to move in a plane passing at an angle to said table and within its range, as well as to swing outward and upward to a position clear of said table, said tool-supporting carriage being provided with an extension, as E', of operative means whereby said ram may be advanced and exert a pressure through said extension upon said tool-supporting carriage in such direction as tends to move it about its pivotal connection aforesaid, and thereby advance the tool which it may bear toward the table, substantially as and for the purposes hereinbefore described.

15. The combination, with the rotative boring-mill table, of a pivoted tool-supporting carriage adapted to swing in a plane passing across into said table's swing range, as well as to swing outward and away therefrom to a position clear of said table and the path of incoming work, a ram pivotally connected to relatively-fixed supports and removably and pivotally connected to said carriage, and operative mechanism for advancing said ram, substantially as and for the purposes hereinbefore described.

16. The combination, with the rotative boring-mill table, of a pivotally-trunnioned tool-supporting carriage adapted to swing in a plane passing at an angle to said table and within its (the table's) swing-range, as well as to swing upward and outward therefrom to a position clear of said table, a ram trunnioned to relatively-fixed supports and removably and pivotally connected to said tool-supporting carriage by a rearward carriage extension, as E', in such manner as to exert a pressure thereon when said ram is actuated as shall tend to or actually move said carriage toward said table's swing range, and operative mechanism whereby said ram may be so advanced, substantially as and for the purposes hereinbefore described.

17. The combination, with the rotative boring-mill table, of a pivoted tool-supporting carriage, said carriage having a slide-rest guideway formed integral therein, a slide-rest slide-block fitted slidingly thereto, operative mechanism to feed the same along said guideway, and a tool-holder formed on or attached to said slide-block, substantially as and for the purposes hereinbefore described.

18. The combination, with the rotative boring-mill table or equivalent rotative faceplate, of a pivoted tool-supporting carriage provided at or near its free and table or faceplate adjoining side with a tool-holder and said holder adapted to hold more than one tool arranged tandemwise, substantially as and for the purposes hereinbefore described.

19. The combination, with the rotative boring-mill table or equivalent rotative faceplate, of a pivoted tool-supporting carriage provided at or near its free and table or faceplate adjoining side with a tool-holder, and said tool-holder adapted to hold a plurality of tools arranged tandemwise and in respect to the work they are to operate on at progressively-advanced distances the one from the other, so that they may be used successively in a series, substantially as and for the purposes hereinbefore described.

20. The combination, with the rotative boring-mill table, of a pivoted tool-supporting carriage pivoted to swing from clear to operative positions ranging within said table's swing range, said carriage being provided with a slide-rest guideway, operative means for adjustably clamping said carriage within said table's swing range, a slide-rest slide-block slidingly fitted to said carriage guideway, an advancing ram fixed to one of said last two elements of combination, operative mechanism for advancing said ram and causing it to exert an advancing pressure upon said slide-block and a holdback-screw with nut and abutment operative to restrain or permit and control the advance of said slide-block along said slideway, substantially as and for the purposes hereinbefore described.

21. The combination, with the rotative boring-mill table, of a pivoted tool-supporting carriage adapted to swing from clear to operative positions ranging within said table's swing range, said carriage being provided with a slide-rest guideway, an advancing ram adapted to move said carriage with circular feed motions, operative mechanism for actuating said ram to that effect, a slide-rest slide-block slidingly fitted to said carriage-guideway, a slide-block-advancing ram adapted to move said slide-block along said ways, operative mechanism for actuating said ram to that effect, holdback-screws with nuts and abutments for both said rams, respectively, as described, and a tool-holder, the whole operative substantially as and for the purposes hereinbefore described.

22. The combination of a rotative boring-mill table provided with a downwardly-projecting cone-shaped mandrel part located, as described, in close association with and near to a marginal bed-bearing surface with which said table is also provided, a bed-trackway adapted to receive said table's bed-bearing surface, a mandrel-cone collar for aforesaid cone-shaped mandrel part, and operative mechanism to hold said table to said trackway with freedom for rotation, substantially as and for the purposes hereinbefore described.

23. The combination of a rotative boring-mill table provided with a downwardly-projecting cone-shaped mandrel part located, as described, in close association with and near to a marginal bed-bearing surface with which said table is also provided, a bed-trackway adapted to receive said table's bed-bearing surface, a mandrel-cone collar for aforesaid cone-shaped mandrel part, said collar being cup-shaped and adapted to receive and retain the necessary lubricant, and operative mechanism to hold said table to said trackway with freedom for rotation, substantially as and for the purposes hereinbefore described.

24. The combination of a rotative boring-mill table provided with a downwardly-projecting cone-shaped mandrel part located, as described, in close association and near to a marginal bed-bearing surface with which said table is also provided, a bed-trackway adapted to receive said table's bed-bearing surface, a mandrel-cone collar for aforesaid cone-shaped mandrel part, said cone-collar being vertically adjustable, as by screws $K^2$, and operative mechanism to hold said table to said trackway with freedom for rotation, substantially as and for the purposes hereinbefore described.

25. The combination of a rotative boring-mill table provided with a downwardly-projecting cone-shaped mandrel part located, as described, in close association with and near to a marginal bed-bearing surface with which said table is also provided, a bed-trackway adapted to receive said table's bed-bearing surface, a mandrel-cone collar for aforesaid cone-shaped mandrel part, said cone-collar being laterally guided and vertically adjustable, as by screws $K^2$, and operative mechanism to hold said table to said trackway with freedom for rotation, substantially as and for the purposes hereinbefore described.

26. The combination of a rotative boring-mill table having a central aperture, as described, and provided with a concentric hollow downwardly-projecting cone-shaped mandrel part, and a marginal bed-bearing surface, a bed-trackway adapted to receive said table bed-bearing surface, an annular cone-collar bearing, and operative mechanism to hold said table to said trackway with freedom for rotation, substantially as and for the purposes hereinbefore described.

27. The combination of a rotative boring-mill table having a transversely-projecting cone-shaped mandrel part, means for supporting and rotating said table in a definite plane, a cone-collar adapted to register with said cone-shaped mandrel part, and mechanism operative to adjust said collar to and from a bearing contact with said table's cone-shaped mandrel part, substantially as and for the purposes hereinbefore described.

FREDERICK W. TAYLOR.

Witnesses:
LEWIS R. DICK,
JOSHUA MATLACK, Jr.